(12) United States Patent
Yeh

(10) Patent No.: US 8,717,365 B2
(45) Date of Patent: May 6, 2014

(54) POLYLINE VERTEX REDUCTION

(75) Inventor: Ching-Yun Yeh, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 799 days.

(21) Appl. No.: 12/852,914

(22) Filed: Aug. 9, 2010

(65) Prior Publication Data

US 2012/0032962 A1 Feb. 9, 2012

(51) Int. Cl.
*G06T 11/20* (2006.01)

(52) U.S. Cl.
USPC .............................................. 345/441; 703/2

(58) Field of Classification Search
None
See application file for complete search history.

(56) References Cited

U.S. PATENT DOCUMENTS 5,444,825 A * 8/1995 Bain et al. ..................... 345/443

OTHER PUBLICATIONS

Shi, et al "Performance Evaluation of Line Simplification Algorithms for Vector Generalization", The Cartographic Journal, 43(1), pp. 27-44, Mar. 2006.*

Mohammadi, E. "A New Line Simplification Method", The 5th International Symposium on Mobile Mapping Technology MMT'07, Padua, Italy, May 28-31, 2007.*

Zhou, et al "Shape-Aware Line Generalisation With Weighted Effective Area", Developments in Spatial Handling, 11th Intl Symposium on Spatial Data Handling, pp. 369-380, Springer Berlin Heidelberg.*

Cartmell, A. "Implementation of Douglas-Peucker in PHP", [online], [retrieved Mar. 2, 2013], http://plugins.svn.wordpress/org/tracks2map/trunk/inc/PolylineReducer.inc, Aug. 2009.*

Heckbert, et al "Survey of Polygonal Surface Simplification Algorithms", Tech. rep., Carnegie Mellon University, 1997.*

* cited by examiner

*Primary Examiner* — Ulka Chauhan
*Assistant Examiner* — Patrick F Valdez

(57) ABSTRACT

Data is received that describes a polyline having a first endpoint, a second endpoint, and a plurality of intermediate vertices, each of the intermediate vertices lying between the first endpoint and the second endpoint. An estimation line segment is drawn between the first endpoint and the second endpoint. An intermediate vertex is identifies as a pivot vertex from the plurality of intermediate vertices that is a greatest distance from the estimation line segment. A flatness ratio is calculated by dividing a distance of the pivot vertex from the estimation line segment by a length of the estimation line segment In a computer, the flatness ratio is compared to a predetermined threshold value. If the flatness ratio does not exceed the predetermined threshold value, the intermediate vertices are discarded, thereby modifying the polyline.

15 Claims, 10 Drawing Sheets

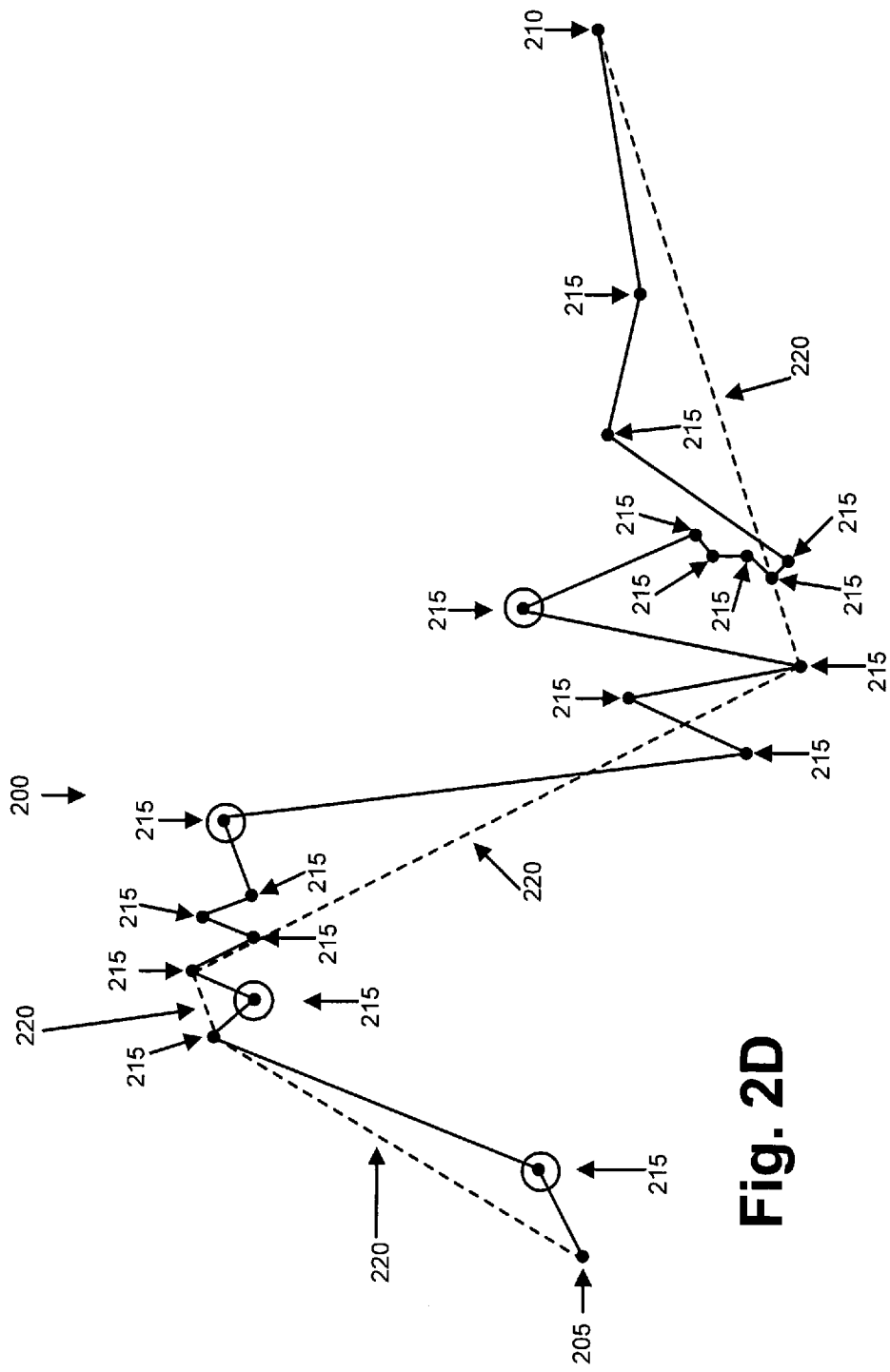

POLYLINE VERTEX REDUCTION

BACKGROUND INFORMATION

A polyline is a geometric shape composed of line segments. Each line segment in a polyline generally has an endpoint in common with another line segment in the polyline, thereby forming a vertex of the polyline, although this is not true in the case of a polyline that is not a closed polygon. In that case, an endpoint of each of two line segments is an endpoint of the polyline. In any event, polylines often occur in applications that display graphical images. To take just one example, mapping applications often use polylines. Such polylines often have many vertices, and are computationally expensive to process and display. It is therefore often desirable to reduce the number of vertices in a polyline when rendering the polyline. Unfortunately, present systems and methods for efficiently processing and rendering polylines are lacking.

BRIEF DESCRIPTION OF THE DRAWINGS

FIGS. 2A-2H illustrates an exemplary polyline and iterative processing of the polyline to reduce the number of vertices in the polyline.

DETAILED DESCRIPTION OF PREFERRED EMBODIMENTS

Figure 1:
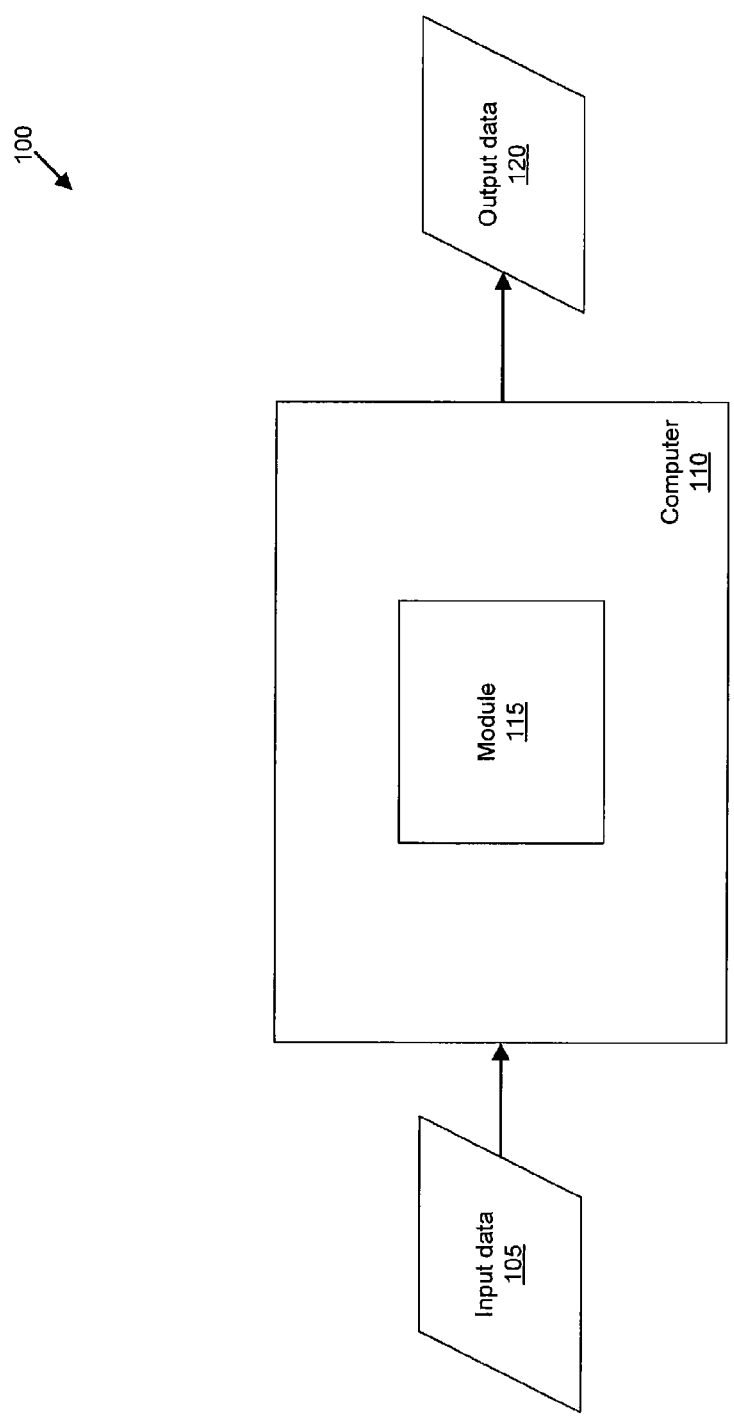
FIG. 1 illustrates an exemplary system for polyline vertex reduction.

FIG. 1 illustrates an exemplary system 100 for processing a polyline. The system 100 includes polyline input data 105 that may be provided to a computer 110. Polyline processing module 115 may be stored on a computer-readable medium within or accessible by computer 110, and generally includes instructions for processing input data 105 as described herein. The module 115 generally provides polyline output data 120. In general, if input data 105 describes a polyline with a given number of vertices, module 115 processes the data 105 to reduce the number of vertices in a polyline described by output data 120.

Figure 2A:
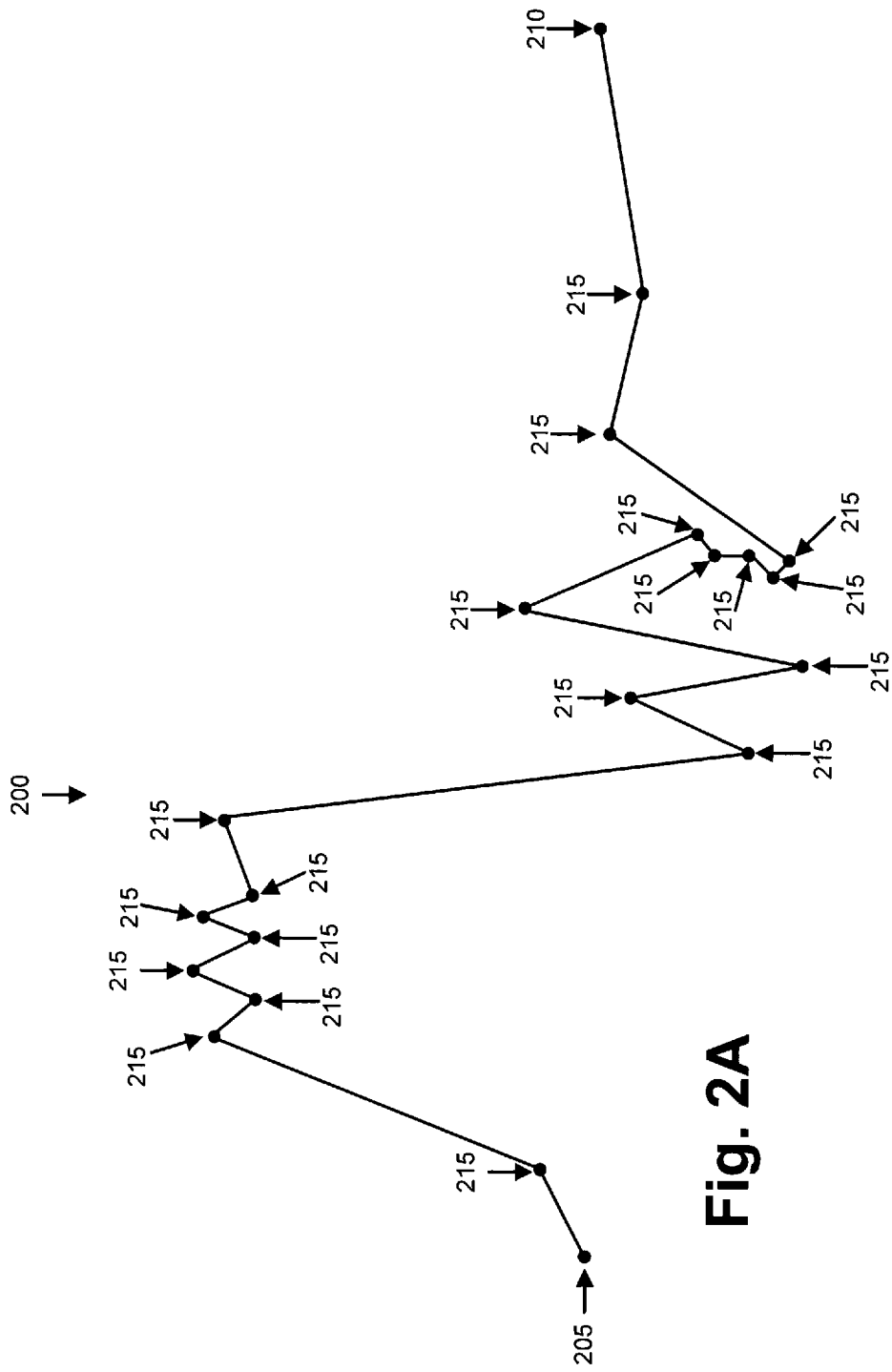

FIG. 2A illustrates an exemplary polyline 200, including a first endpoint 205 and a second endpoint 210. Endpoints 205 and 210 may also be referred to as vertices 205 and 210. The polyline 200 also includes a plurality of intermediate vertices 215. In the case where the polyline 200 is a closed polygon (not illustrated in figures), a particular vertex of the polygon may be selected as an endpoint, i.e., to serve as both endpoints 205 and 210, with other vertices of the polygon serving as intermediate vertices 215. Further, polyline 200 may be a selected segment or subset of a larger polyline.

FIGS. 2B-2H provide further illustrations of the polyline 200 as it undergoes a vertex reduction process. FIG. 3 illustrates an exemplary vertex reduction process 300, discussed herein with reference to FIGS. 2A-2H. Process 300 is generally conducted according to instructions included in module 115 and executed by a computer 110. As described herein, the process 300 is a recursive process that begins by operating on a polyline 200, and then, in subsequent iterations, operates on successive subsets of the polyline 200. Therefore, it will be understood that in the following description of the process 300, that certain references to polyline 200 could also apply to processing performed on subsets of polyline 200, such subsets being identified and provided for processing as described below. Further, it is to be understood that implementations other than what is described herein are possible, including implementations that do not use recursion.

As mentioned above, process 300 operates to reduce the number of vertices 215 in polyline 200 so that polyline 200 may be more efficiently processed, stored, and rendered. In some cases, as can be seen by simply visually inspecting FIG. 2, a vertex 215 may be removed from a polyline 200 without significantly degrading the polyline 200. Use of a ratio, sometimes called a flatness ratio, of the distance of a vertex 215 from a line segment sometimes known as an estimation line 220, discussed further below and seen in FIG. 2B, that is drawn between other vertices 205, 210, or 215, to the length of the estimation line 220, may allow for the elimination of more vertices 215 than would be eliminated simply by using the distance alone, without significantly degrading the rendering of the polyline 200 at a desired resolution. Note that, in some cases herein, the term "line" is used to refer to what is in fact a line segment, as is clear from context.

The process 300 begins in a step 305, in which certain values, in particular, a flatness ratio threshold (RT) and a distance threshold (DT) are established. A distance threshold is simply a distance according to a predetermined measurement, e.g., a number of pixels. The numerator of a flatness ratio is the height of a triangle having as its base a line segment formed by selecting two vertices 205, 210, or 215, the sides of the triangle being formed by a third vertex 215. The denominator of a flatness ratio is the length of the base of the triangle.

Figure 2B:
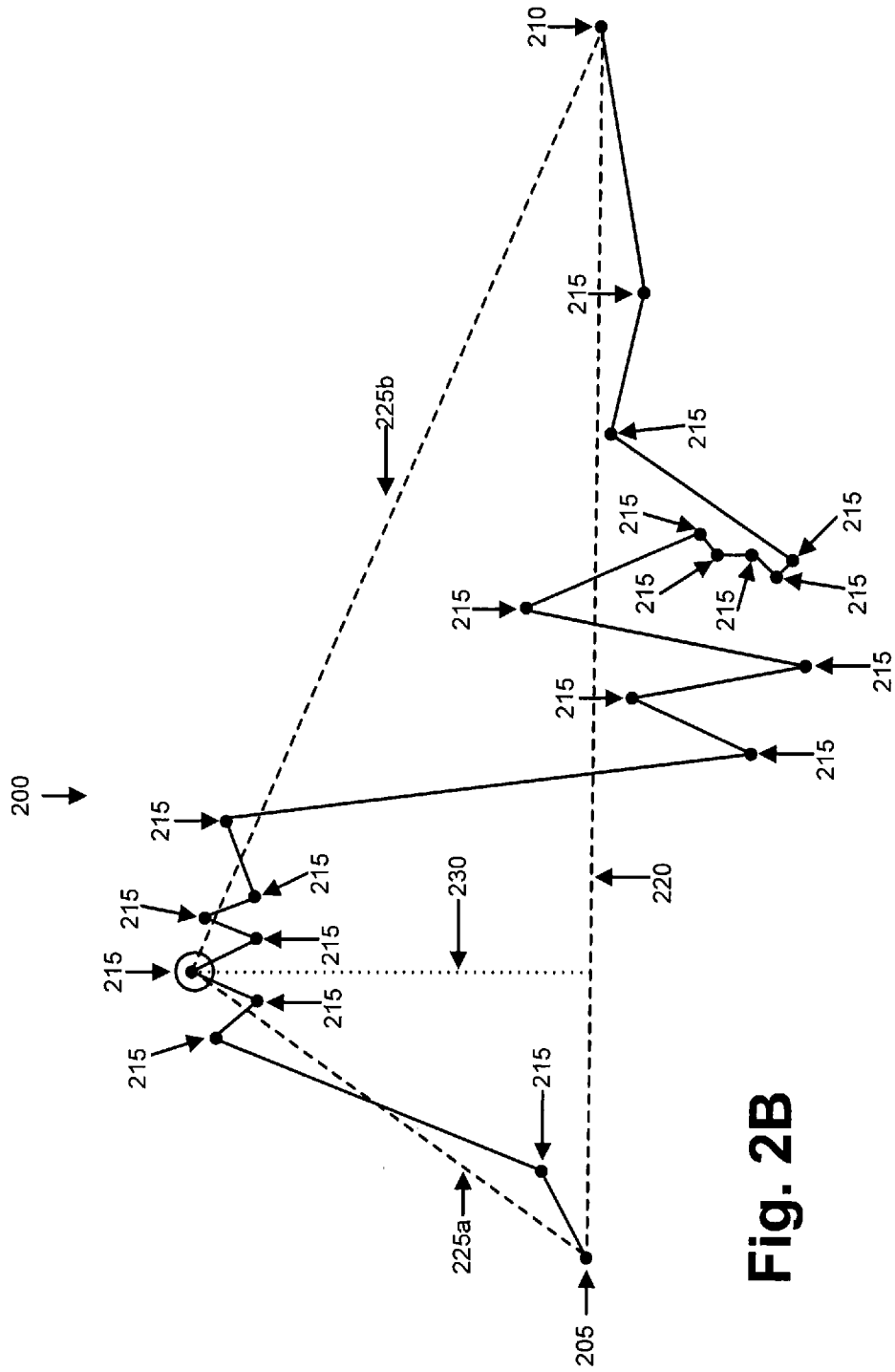
Figure 3:
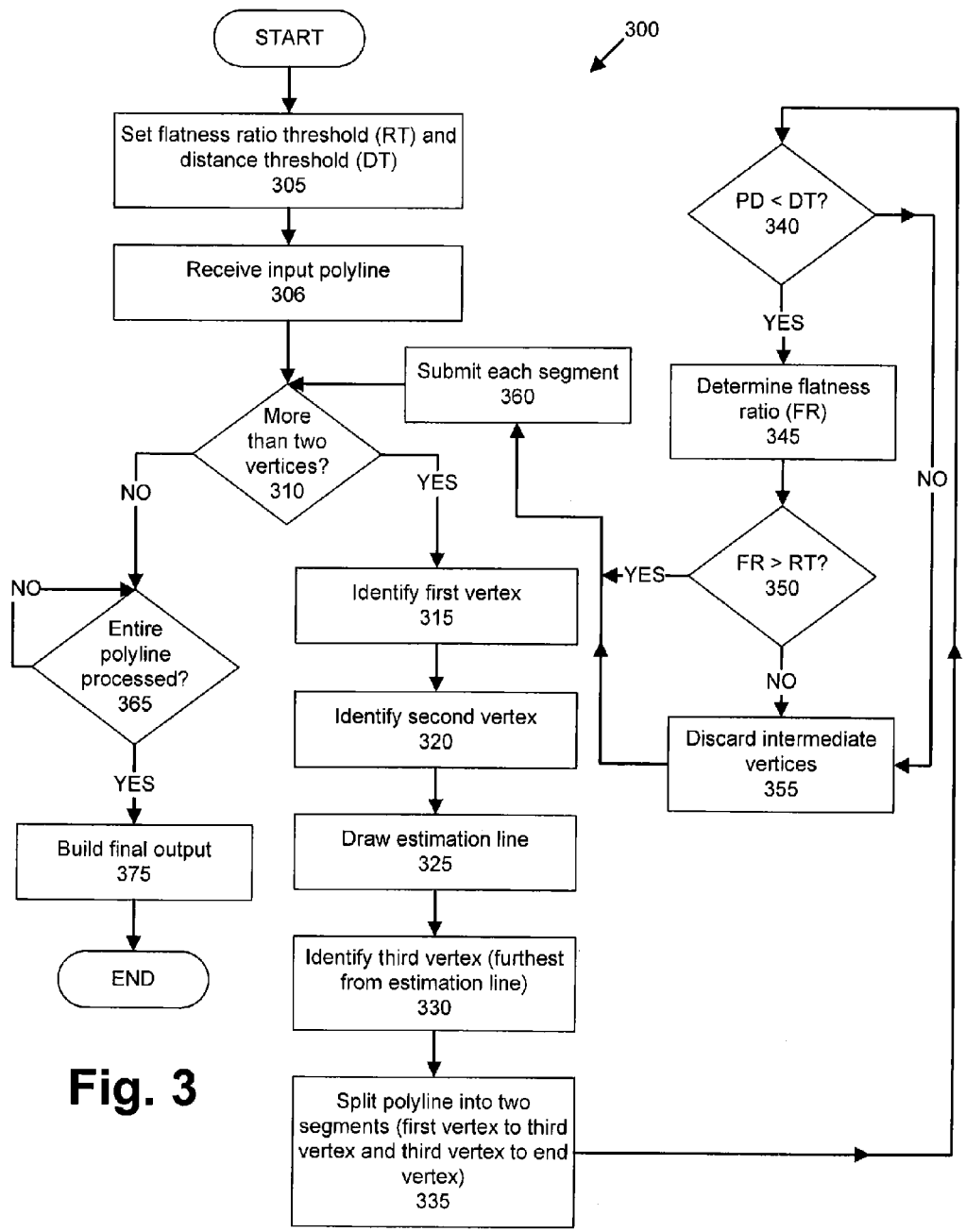
FIG. 3 illustrates an exemplary process for reducing the number of vertices in a polyline.

For example, FIG. 2B shows the triangle having a base 220 that extends between endpoints 205 and 210. The triangle has sides 225a and 225b, and a height indicated by a line segment 230, the line segment 230 being drawn perpendicularly or substantially perpendicularly to the base 220. Accordingly, the distance of the vertex 215 at the apex of the triangle from the base 220 is indicated by the height 230. The flatness ratio associated with the vertex 215 at the apex of the triangle is determined according to the formula H/B, where H is the length of the line segment 230, and B is the length of the base 220. As will be explained below, height 230 and a flatness ratio associated with a vertex 215 may respectively be compared to the values RT and DT.

The values RT and DT may be established according to various mechanisms. For example, such values may be provided by user input, by reading from a file or database, etc. Further, appropriate values for RT and DT may be determined according to various criteria, such as a resolution at which a polyline 200 is expected to be displayed, processing power of a computer 110 or other device expected to process, store, and/or render the polyline 200, etc. In addition, RT and DT could be determined according to an automated or semi-automated process in which a user was asked to specify a percentage of a polyline 200 to be retained, e.g., a percentage of vertices 215 to be retained, in the line 200 included in output data 120. Process 300 could then be performed multiple times with parameters of different values until the proper percentage of vertices 215 were retained.

Returning now to the process 300, following step 305, next, in a step 306, a polyline 200 is received as input data 105 by the module 115. A polyline may be stored in a variety of ways, e.g., as a set of vertices, distances, and angles.

Next, in a step 310, the module 115 determines whether the input polyline 200, or, if step 310 is being visited for a second, third, etc., time, possibly a segment of the polyline 200, includes more than two vertices 205, 210, or 215. If not, the process 300 proceeds to a step 365, discussed below. However, if the polyline 200, or segment thereof, does include more than two vertices 205, 210, or 215, then a step 315 is executed next.

In step 315, the module 115 identifies a first vertex, e.g., the endpoint 205, an intermediate vertex 215 at the end of a segment of the polyline 200, etc.

Next, in a step 320, the module 115 identifies a second vertex, e.g., the endpoint 205, an intermediate vertex 215 at the end of a segment of the polyline 200, etc.

Referring again to FIG. 2B, in an initial iteration of the process 300, in step 315, endpoint 205 could be identified as the first vertex, and in step 320, endpoint 210 could be identified as the second vertex.

Next, in a step 325, the module 115 draws a line, sometimes referred to as an estimation line, between the first vertex and the second vertex. For example, in FIG. 2B, the line 220 is the estimation line.

Next, in a step 330, the module 115 identifies a third vertex by determining which vertex in the plurality of intermediate vertices 215 is furthest from the line 220. The third vertex is sometimes also referred to as the pivot vertex, or the pivotal vertex. In the event that multiple vertices 215 are equidistant from the line segment 220, one of the vertices 215 may be arbitrarily or randomly chosen. The distance of a vertex 215 from the line segment 220 is determined by drawing a line through the vertex 215 that is perpendicular or substantially perpendicular to the line segment 220. In FIG. 2B, the third vertex is the circled vertex 215, and the line segment 230 indicates the distance from the line segment 220 of the vertex 215 that is furthest from the line segment 220 and polyline 200. The distance indicated by the line segment 230 is sometimes referred to as the pivot distance (PD).

Next, in a step 335, the module 115 splits the polyline 200 into two segments (or, in subsequent iterations of process 300, it may be a segment of polyline 200, a segment of a segment, etc. that is split into two segments), a first segment defined by the points between the first vertex and the third vertex, and a second segment defined by the points between the third vertex and the second vertex. Further in step 335, line segments 225 may be re-defined as estimation lines 220 for each of the two new segments of the polyline 200, as is illustrated, e.g., by comparing lines 225 in FIG. 2B to lines 220 in FIG. 2C.

In step 340, module 115 determines whether the pivot distance is less than the distance threshold. If not, the process 300 proceeds to step 355. That is, the third vertex is far enough away from the estimation line 220 that vertices 215 between the third vertex and the first and second vertices respectively, should be retained for the rendering of polyline 200. If, however, the pivot distance is not equal to or greater than the distance threshold, then step 345 is executed next. That is, although vertices 215 are not to be discarded from the segment based on pivot distance, vertices 215 may be discarded based on flatness ratio. In some implementations, step 340 may be omitted, and step 345 may be executed immediately following step 335.

In step 345, module 115 determines a flatness ratio associated with the third vertex, i.e., the vertex 215 that has been determined to be the furthest vertex 215 from the estimation line 220.

Figure 2C:
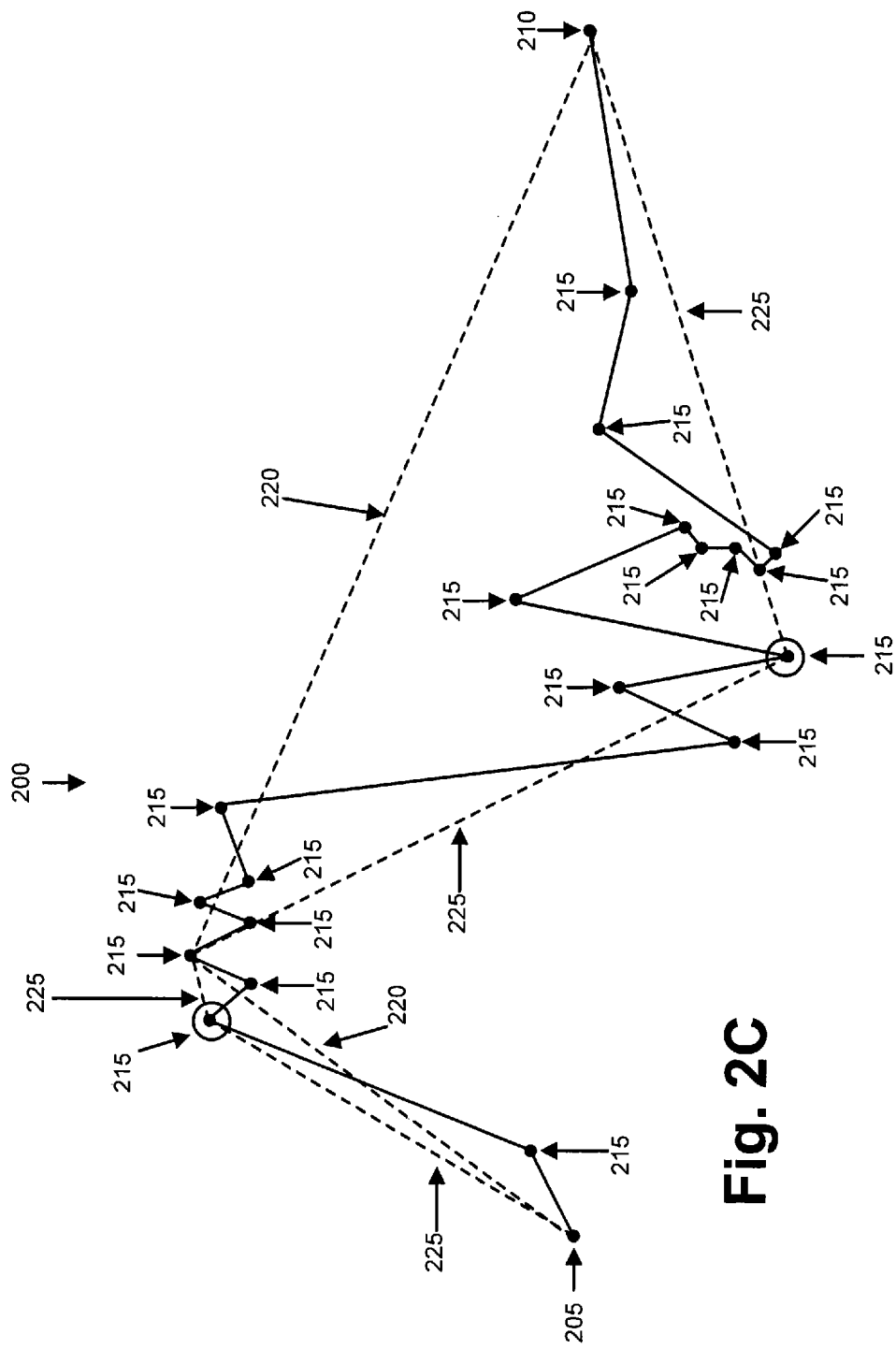
Figure 2E:
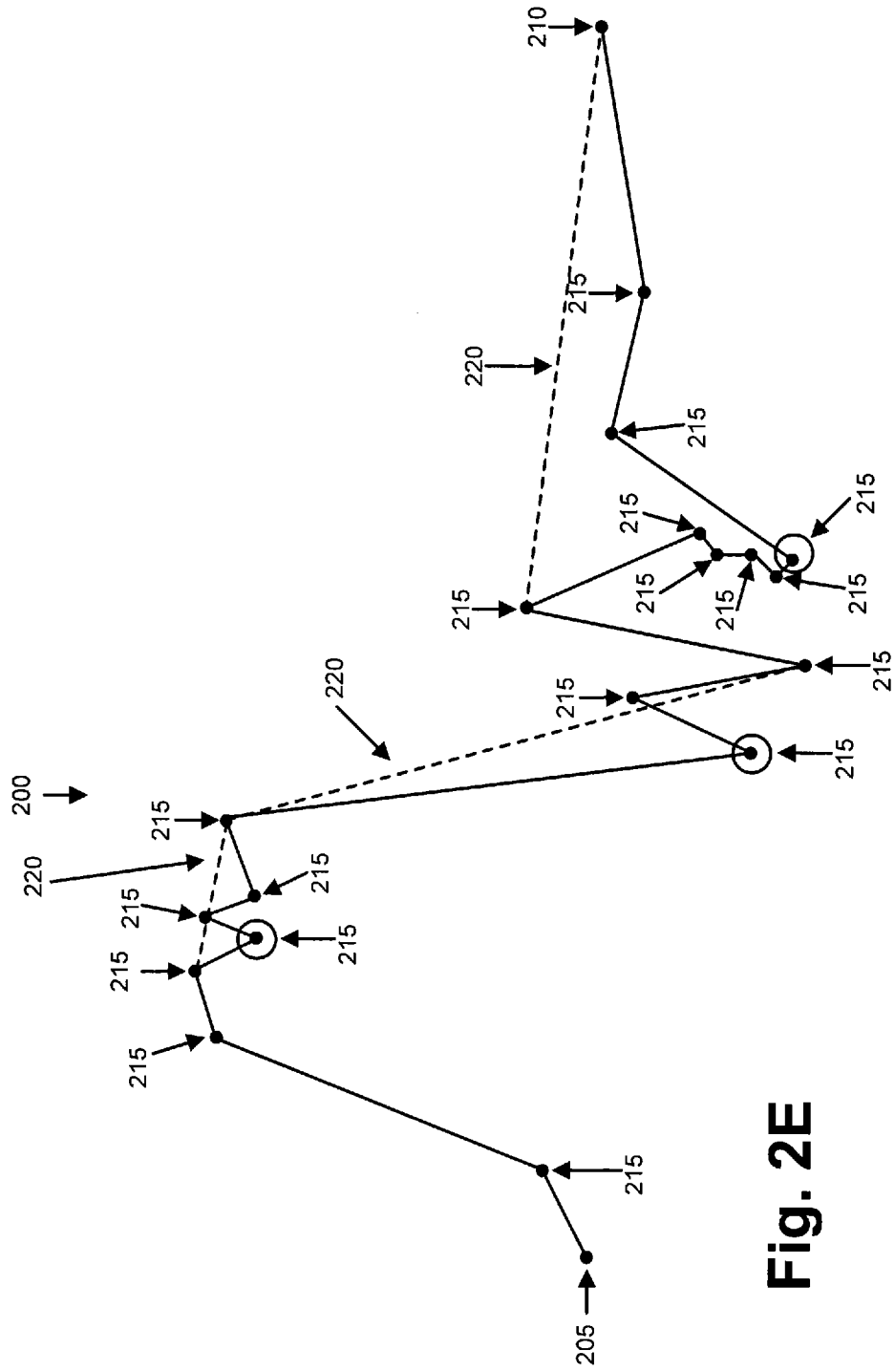
Figure 2F:
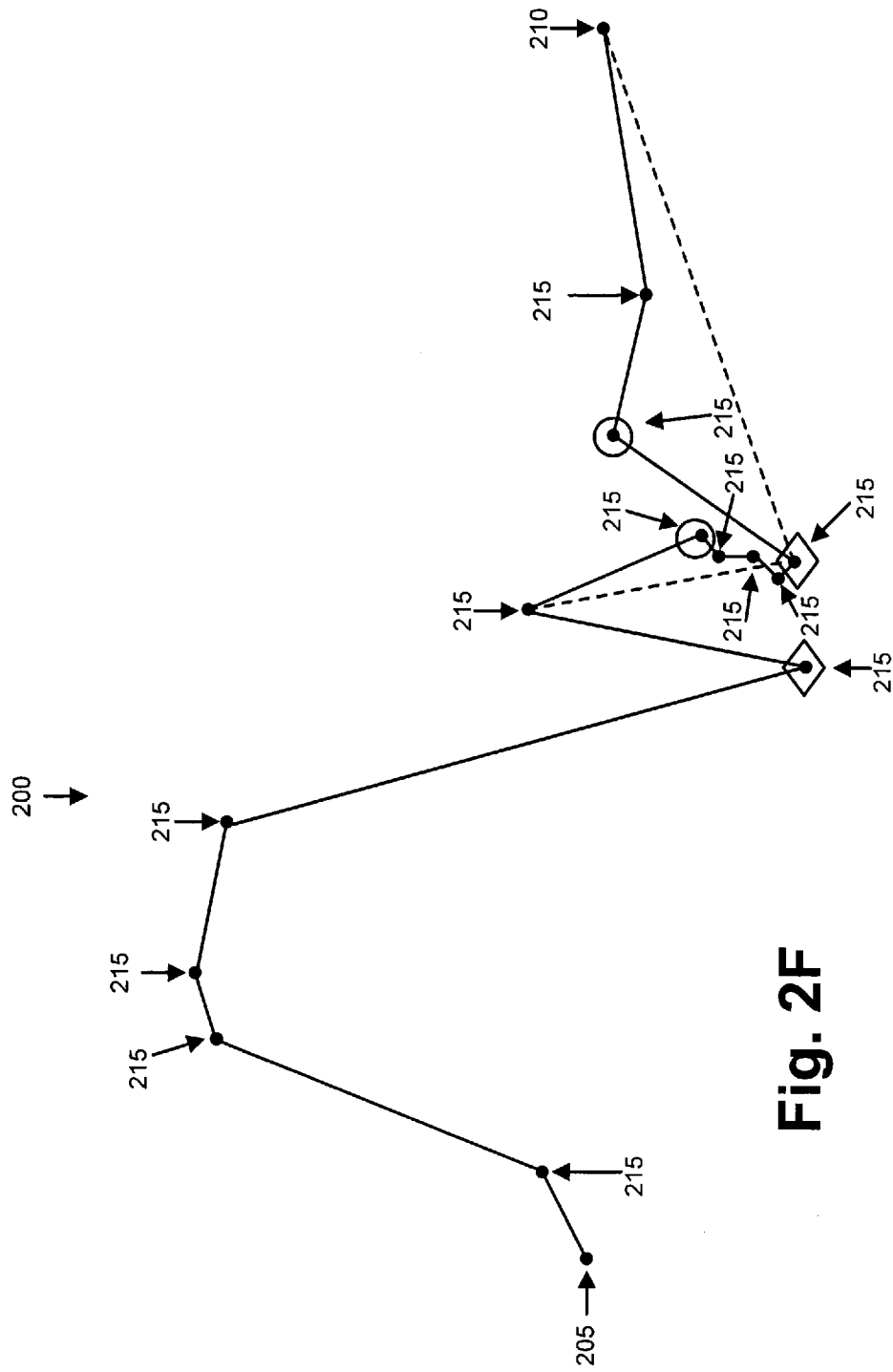
Figure 2G:
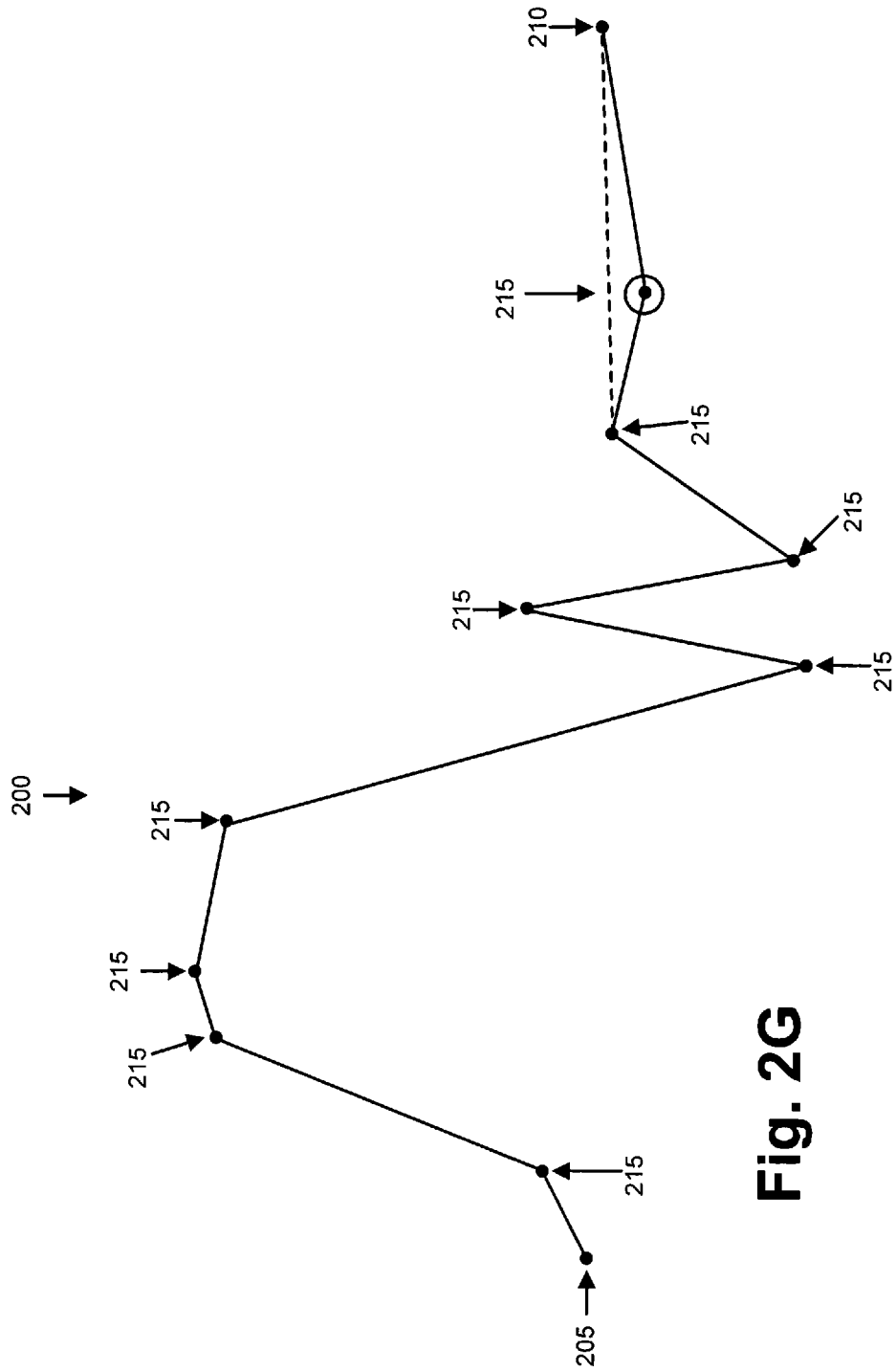

Next, in step 350, the module 115 determines whether the flatness ratio determined in step 345 is greater than the ratio threshold established as described above with respect to step 305. If so, the process 300 proceeds to step 360. If the flatness ratio is equal to or less than the ratio threshold, then step 355 is executed next. By accounting for the distance of the third vertex from the estimation line 220 in the context of the length of the estimation line 220, the flatness ratio allows vertices 215 to be removed from a rendering of the polyline 200 even if such vertices 215 would not be removed by a simple comparison of pivot distance to the distance threshold. Thus, the flatness ratio allows polyline 200 to be rendered and processed more efficiently, generally without substantially diminishing a display or depiction of the polyline 200 at a desired resolution. On the other hand, vertices 215 that are important because they retain a local prominence of polyline 200 are retained. For example, the vertices 215 that are highlighted by diamond shapes in FIG. 2F illustrate vertices 215 that have been retained, as is further illustrated by a comparison of FIG. 2E to FIG. 2F.

In step 355, all vertices 315 between the first and third vertices, and the third and second vertices, respectively, are discarded. Process 300 then proceeds to step 360.

In step 360, each of the two polyline segments identified in step 335 are submitted to process 300 beginning with step 310. That is, processing described with respect to each of the two segments identified in step 335 is performed recursively according to steps 310 through 355 as described herein.

For example, in a first iteration of processing polyline 200, estimation line 220 is determined, and forms a triangle with sides 225a and 225b, as seen in FIG. 2B. Thus, to continue this example, in respective second iterations, the sides 225a and 225b become respective estimation lines 220, as illustrated in FIG. 2C. In FIG. 2C, as in FIG. 2B and also subsequent figures, circled vertices 215 represent third vertices, i.e., vertices 215 that are a furthest distance from estimation line segments 220. Accordingly, step 335 in a respective second iterations would include drawing new sides 225. Then, second iterations of steps 340 through 355 could include new determinations of pivot distance, a flatness ratio, etc., pertaining to the new lines 220 and 225 drawn with respect to the segment of polyline 200 being processed.

Figure 2H:
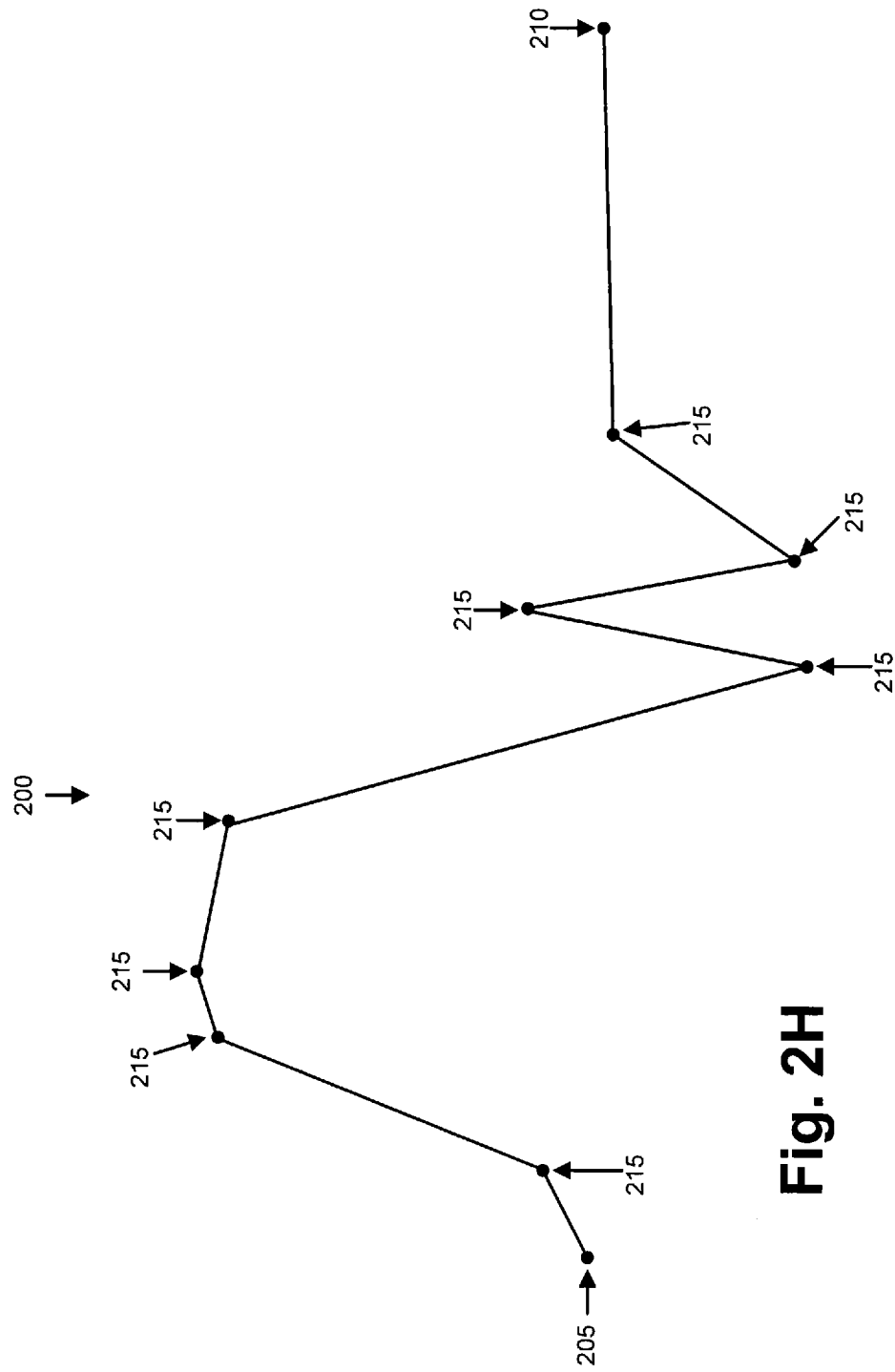

FIGS. 2D through 2H illustrates successive iterations of process 300, all iterations being complete with the reduced version of polyline 200 illustrated in FIG. 2H. In each of the figures, circled vertices 215 are pivot vertices. It is to be understood that these figures are not drawn to scale, but rather are intended to illustrate successive iterations of polyline 200, examples of pivot vertices 215, estimation lines 220, etc., as process 300 is performed.

Recursive processing of segments of polyline 200 ceases when the conditions specified by step 310 is not met, i.e., when a segment submitted from step 360 for processing does not have more than two vertices 205, 210, or 215. In that case, step 365 is executed following step 310.

In step 365, module 115 stores output from process 300 and determines whether processing of polyline 200 is complete. In some implementations, it may be determined that processing of polyline 200 is complete when a recursive method or function called to process the polyline 200 returns a value. If processing of polyline 200 is not complete, i.e., not all segments of the polyline 200 have been processed as described above with respect to steps 310 through 360, then module 115 in step 365 continues to wait for output as provided from step 310. However, if processing of the polyline 200 is complete, then the process 300 proceeds to step 375.

In step 375, the module 115 builds a final rendering of the polyline 200, thereby providing output data 120. As mentioned above, output data 120 including the reduced polyline 200 may be stored and rendered from a variety of formats.

Following step 375, the process 300 ends.

Computing devices such as computer 110 may employ any of a number of computer operating systems, including, but by no means limited to, versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines (IBM) of Armonk, N.Y., and the Linux operating system. In one implementation, computer 110 is a mainframe computer sold by IBM, and uses IBM's z/OS operating system. Computing devices in general may include any one of a number of computing devices, including, without limitation, a computer workstation, a desktop, notebook, laptop, or handheld computer, or some other computing device.

Computing devices such as computer 110, etc., generally each include instructions executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases or data stores described herein may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and are accessed via a network in any one or more of a variety of manners. A file system may be accessible from a computer operating system, and may include files stored in various formats. An RDBMS generally employs Structured Query Language (SQL) in addition to a language for creating, storing, editing, and executing stored procedures, such as the PL/SQL language mentioned above. Database 115 may be any of a variety of known RDBMS packages, including IBMS DB2, or the RDBMS provided by Oracle Corporation of Redwood Shores, Calif.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
   receiving data that describes a polyline having a first endpoint, a second endpoint, and a plurality of intermediate vertices, each of the intermediate vertices lying between the first endpoint and the second endpoint;
   drawing an estimation line segment between the first endpoint and the second endpoint;
   identifying, as a pivot vertex, an intermediate vertex from the plurality of intermediate vertices that is a greatest distance from the estimation line segment;
   calculating a flatness ratio by dividing a distance of the pivot vertex from the estimation line segment by a length of the estimation line segment;
   comparing, in a computer, the flatness ratio to a predetermined threshold value; and
   if the flatness ratio does not exceed the predetermined threshold value, discarding the intermediate vertices, thereby modifying the polyline:
   comparing the distance of the pivot vertex from the estimation line segment to a predetermined distance value; and
   if the distance of the pivot vertex from the estimation line segment does not exceed the predetermined distance value and if the flatness ratio does not exceed the predetermined threshold value, discarding the intermediate vertices;
   if the distance of the pivot vertex from the estimation line segment exceeds the predetermined distance value or if the flatness ratio exceeds the predetermined threshold value, splitting the polyline into a second polyline and a third polyline, the second polyline having as endpoints the first endpoint and the pivot vertex, and the third polyline having as endpoints the pivot vertex and the second endpoint;
   determining if the second polyline has vertices in addition to the first endpoint and the pivot vertex;
   if the second polyline has vertices in addition to the first endpoint and the pivot vertex, drawing a second estimation line between the first endpoint and the pivot vertex;

identifying, as a second pivot vertex, an intermediate vertex from the plurality of intermediate vertices that is a greatest distance from the second estimation line segment;

calculating a second flatness ratio by dividing a distance of the second pivot vertex from the second estimation line segment by a length of the second estimation line segment;

comparing, in a computer, the second flatness ratio to the predetermined threshold value; and if the second flatness ratio does not exceed the predetermined threshold value, discarding the second pivot vertex and intermediate vertices, if any, between the first endpoint and the pivot vertex;

if the third polyline has vertices in addition to the pivot vertex and the second endpoint, drawing a third estimation line between the pivot vertex and the second endpoint;

identifying, as a third pivot vertex, an intermediate vertex from the plurality of intermediate vertices that is a greatest distance from the third estimation line segment;

calculating a third flatness ratio by dividing a distance of the third pivot vertex from the third estimation line segment by a length of the third estimation line segment;

comparing, in a computer, the third flatness ratio to the predetermined threshold value; and if the third flatness ratio does not exceed the predetermined threshold value, discarding the third pivot vertex and intermediate vertices, if any, between the pivot vertex and the second endpoint.

2. The method of claim 1, wherein the polyline is a subset of a second polyline.

3. The method of claim 1, wherein the distance of the pivot vertex from the estimation line segment is measured in pixels.

4. The method of claim 1, further comprising providing the polyline in a computer display.

5. The method of claim 1, further comprising comparing the flatness ratio to a predetermined threshold value only if the distance of the pivot vertex from the estimation line segment does not exceed the predetermined distance value.

6. A non-transitory computer-readable medium tangibly embodying computer-executable instructions including instructions for:

receiving data that describes a polyline having a first endpoint, a second endpoint, and a plurality of intermediate vertices, each of the intermediate vertices lying between the first endpoint and the second endpoint;

drawing an estimation line segment between the first endpoint and the second endpoint;

identifying, as a pivot vertex, an intermediate vertex from the plurality of intermediate vertices that is a greatest distance from the estimation line segment;

calculating a flatness ratio by dividing a distance of the pivot vertex from the estimation line segment by a length of the estimation line segment;

comparing, in a computer, the flatness ratio to a predetermined threshold value; and if the flatness ratio does not exceed the predetermined threshold value, discarding the intermediate vertices, thereby modifying the polyline;

comparing the distance of the pivot vertex from the estimation line segment to a predetermined distance value; and if the distance of the pivot vertex from the estimation line segment does not exceed the predetermined distance value and if the flatness ratio does not exceed the predetermined threshold value, discarding the intermediate vertices, wherein comparing the flatness ratio to a predetermined threshold value is performed only if the distance of the pivot vertex from the estimation line segment does not exceed the predetermined distance value;

if the distance of the pivot vertex from the estimation line segment exceeds the predetermined distance value or if the flatness ratio exceeds the predetermined threshold value, splitting the polyline into a second polyline and a third polyline, the second polyline having as endpoints the first endpoint and the pivot vertex, and the third polyline having as endpoints the pivot vertex and the second endpoint;

determining if the second polyline has vertices in addition to the first endpoint and the pivot vertex;

if the second polyline has vertices in addition to the first endpoint and the pivot vertex, drawing a second estimation line between the first endpoint and the pivot vertex;

identifying, as a second pivot vertex, an intermediate vertex from the plurality of intermediate vertices that is a greatest distance from the second estimation line segment;

calculating a second flatness ratio by dividing a distance of the second pivot vertex from the second estimation line segment by a length of the second estimation line segment;

comparing, in a computer, the second flatness ratio to the predetermined threshold value; and if the second flatness ratio does not exceed the predetermined threshold value, discarding the second pivot vertex and intermediate vertices, if any, between the first endpoint and the pivot vertex;

if the third polyline has vertices in addition to the pivot vertex and the second endpoint, drawing a third estimation line between the pivot vertex and the second endpoint;

identifying, as a third pivot vertex, an intermediate vertex from the plurality of intermediate vertices that is a greatest distance from the third estimation line segment;

calculating a third flatness ratio by dividing a distance of the third pivot vertex from the third estimation line segment by a length of the third estimation line segment;

comparing, in a computer, the third flatness ratio to the predetermined threshold value; and if the third flatness ratio does not exceed the predetermined threshold value, discarding the third pivot vertex and intermediate vertices, if any, between the pivot vertex and the second endpoint.

7. The medium of claim 6, wherein the polyline is a subset of a second polyline.

8. The medium of claim 6, wherein the distance of the pivot vertex from the estimation line segment is measured in pixels.

9. The medium of claim 6, further comprising instructions for providing the polyline in a computer display.

10. The medium of claim 6, further comprising instructions for comparing the flatness ratio to a predetermined threshold value only if the distance of the pivot vertex from the estimation line segment does not exceed the predetermined distance value.

11. A system, comprising:

a computing device configured to:

receive receiving data that describes a polyline having a first endpoint, a second endpoint, and a plurality of intermediate vertices, each of the intermediate vertices lying between the first endpoint and the second endpoint;

draw an estimation line segment between the first endpoint and the second endpoint;

identify, as a pivot vertex, an intermediate vertex from the plurality of intermediate vertices that is a greatest distance from the estimation line segment;

calculate a flatness ratio by dividing a distance of the pivot vertex from the estimation line segment by a length of the estimation line segment;

compare the flatness ratio to a predetermined threshold value; and if the flatness ratio does not exceed the predetermined threshold value, discarding the intermediate vertices, thereby modifying the polyline;

comparing the distance of the pivot vertex from the estimation line segment to a predetermined distance value; and if the distance of the pivot vertex from the estimation line segment does not exceed the predetermined distance value and if the flatness ratio does not exceed the predetermined threshold value, discarding the intermediate vertices;

if the distance of the pivot vertex from the estimation line segment exceeds the predetermined distance value or if the flatness ratio exceeds the predetermined threshold value, split the polyline into a second polyline and a third polyline, the second polyline having as endpoints the first endpoint and the pivot vertex, and the third polyline having as endpoints the pivot vertex and the second endpoint;

determine if the second polyline has vertices in addition to the first endpoint and the pivot vertex;

if the second polyline has vertices in addition to the first endpoint and the pivot vertex, draw a second estimation line between the first endpoint and the pivot vertex;

identify, as a second pivot vertex, an intermediate vertex from the plurality of intermediate vertices that is a greatest distance from the second estimation line segment;

calculate a second flatness ratio by dividing a distance of the second pivot vertex from the second estimation line segment by a length of the second estimation line segment;

compare the second flatness ratio to the predetermined threshold value; and if the second flatness ratio does not exceed the predetermined threshold value, discard the second pivot vertex and intermediate vertices, if any, between the first endpoint and the pivot vertex;

if the third polyline has vertices in addition to the pivot vertex and the second endpoint, draw a third estimation line between the pivot vertex and the second endpoint;

identify, as a third pivot vertex, an intermediate vertex from the plurality of intermediate vertices that is a greatest distance from the third estimation line segment;

calculate a third flatness ratio by dividing a distance of the third pivot vertex from the third estimation line segment by a length of the third estimation line segment;

compare the third flatness ratio to the predetermined threshold value; and if the third flatness ratio does not exceed the predetermined threshold value, discard the third pivot vertex and intermediate vertices, if any, between the pivot vertex and the second endpoint.

12. The system of claim 11, wherein the polyline is a subset of a second polyline.

13. The system of claim 11, wherein the distance of the pivot vertex from the estimation line segment is measured in pixels.

14. The system of claim 11, the computing device further configured to provide the polyline in a computer display.

15. The system of claim 11, the computing device further configured to compare the flatness ratio to a predetermined threshold value only if the distance of the pivot vertex from the estimation line segment does not exceed the predetermined distance value.

* * * * *